United States Patent
Wong et al.

(10) Patent No.: US 10,090,750 B1
(45) Date of Patent: Oct. 2, 2018

(54) ISOLATING SWITCH CIRCUIT AND CONTROL METHOD THEREOF

(71) Applicant: JOULWATT TECHNOLOGY (HANGZHOU) CO., LTD., Hangzhou (CN)

(72) Inventors: Pitleong Wong, Hangzhou (CN); Yuancheng Ren, Hangzhou (CN); Xunwei Zhou, Hangzhou (CN)

(73) Assignee: JOULWATT TECHNOLOGY (HANGZHOU) CO., LTD., Hangzhou (CN)

( * ) Notice: Subject to any disclaimer, the term of this patent is extended or adjusted under 35 U.S.C. 154(b) by 0 days.

(21) Appl. No.: 15/871,972

(22) Filed: Jan. 15, 2018

(30) Foreign Application Priority Data

Mar. 28, 2017 (CN) .......................... 2017 1 0194021

(51) Int. Cl.
*H02M 1/08* (2006.01)
*H02M 3/335* (2006.01)
*H02M 1/00* (2006.01)

(52) U.S. Cl.
CPC ......... *H02M 1/08* (2013.01); *H02M 3/33592* (2013.01); *H02M 2001/0009* (2013.01)

(58) Field of Classification Search
CPC ............... H02M 1/08; H02M 3/33592; H02M 2001/0009
See application file for complete search history.

(56) References Cited

U.S. PATENT DOCUMENTS

| 8,873,254 B2 * | 10/2014 | Morris | H02M 3/335 363/21.14 |
| 8,964,421 B2 * | 2/2015 | Kong | H02M 3/33592 363/21.06 |
| 9,768,703 B2 * | 9/2017 | Yang | H02M 1/32 |
| 2018/0115252 A1 * | 4/2018 | Chang | H02M 3/33592 |

\* cited by examiner

*Primary Examiner* — Emily P Pham
(74) *Attorney, Agent, or Firm* — Perkins Coie LLP

(57) ABSTRACT

The present invention provides an isolating switch circuit and a control method. The present invention takes first time information as a characteristic to control and adjust primary and secondary sides The primary side identifies the first time information by detecting the voltage between two ends of a main power switch transistor, and the secondary side compares a sampling output voltage or/and output current with a corresponding reference signal to obtain a first control signal representing the first time information. The present invention does not need to use the optical coupler to carry out isolated transmission of primary and secondary signals, which reduces the cost of the circuit, and the freewheeling time of a parasitic diode of a synchronous rectification transistor is taken as a characteristic to carry out identifying and controlling, such that power consumption is low and the control and adjustment is more precisely.

20 Claims, 3 Drawing Sheets

ISOLATING SWITCH CIRCUIT AND CONTROL METHOD THEREOF

CROSS-REFERENCE TO RELATED APPLICATIONS

This Non-provisional application claims priority under 35 U.S.C. § 119(a) on Patent Application No(s). 201710194021.5 filed in People's Republic of China on Mar. 28, 2017, the entire contents of which are hereby incorporated by reference.

BACKGROUND OF THE INVENTION

Field of the Invention

The present invention relates to a technical field of power electronics and, more particularly, to an isolating switch circuit and a control method thereof.

Description of the Related Art

Synchronous rectification is a method of using a power MOSFET with a relatively low on-resistance to replace a rectifier diode to reduce a rectification loss and is used in isolating switch circuits. The isolating switch circuit in the prior art generally includes a main power switch transistor, a transformer and a synchronous rectification transistor. The control circuit controls the turn-on state of the main power switch transistor, and the synchronous rectification control circuit controls a synchronous rectification transistor to realize the synchronous rectification. In an isolating switch circuit, an optical coupler is often adopted to realize transmission of primary and secondary feedback signals.

As shown in FIG. 1, a flyback switch circuit based on the synchronous rectification in the prior art is shown. A secondary signal is transmitted to the primary side through the optical coupler by sampling an output voltage of the secondary side and is received by a control circuit. The control circuit controls the action of the main power switch transistor correspondingly according to a feedback signal transmitted by the optical coupler. The optical coupler is used to achieve the signal transmission of the primary and secondary sides of the isolating switch circuit, although this can solve the problem of isolation, the technical problems of increasing the cost and enlarging the power consumption still exist. Further, the isolating switch circuit of the prior art based on the primary control has the technical problem of low precision.

BRIEF SUMMARY OF THE INVENTION

An objective of the present invention is to provide an isolating switch circuit and a control method thereof to solve technical problems of high cost, large power consumption and low precision existing in the prior art, so as to reduce the cost and power consumption, improve the detection precision of a feedback signal, and facilitate controlling with high precision.

To achieve the above objective, the present invention provides an isolating switch circuit including a main power switch transistor, a transformer and a synchronous rectification transistor, the transformer includes a primary winding and a secondary winding, the main power switch transistor is connected with the primary winding, and the synchronous rectification transistor is connected with the secondary winding;

a secondary control circuit receives a first control signal representing first time information, the secondary control circuit is connected with a control end of the synchronous rectification transistor, and the first control signal is configured to control turn-off of the synchronous rectification transistor; the first time information is: time from a moment when the synchronous rectification transistor turns off a parasitic diode to start freewheeling to a moment when a secondary current decreases to zero within one switching cycle, or a ratio of the time from the moment when the synchronous rectification transistor turns off the parasitic diode to start freewheeling to the moment when the secondary current decreases to zero within one switching cycle and time from a turn-on moment of the synchronous rectification transistor to the moment when the secondary current decreases to zero, or a product of the time from the moment when the synchronous rectification transistor turns off the parasitic diode to start freewheeling to the moment when the secondary current decreases to zero within one switching cycle and a sampling voltage signal representing an output voltage; and the first time information is detected from a primary side to obtain a detection signal representing the first time information, and a state of the main power switch transistor is adjusted through a primary control circuit according to the detection signal representing the first time information.

Optionally, the first control signal may be obtained by a following method: sampling the output voltage or/and an output current of the isolating switch circuit to obtain the corresponding sampling voltage signal, and comparing the corresponding sampling voltage signal with a corresponding reference signal to obtain the first control signal representing the first time information.

Optionally, according to the detection signal representing the first time information, second time or/and a peak-current of the primary winding may be adjusted, and the second time may be time from an ending moment of a current switching cycle to a turn-on moment of the main power switch transistor in a next switching cycle or an interval between starting moments of two switching cycles.

Optionally, detecting the first time information from the primary may refer to obtaining the detection signal representing the first time information through directly detecting or detecting a voltage between two ends of the main power switch transistor via auxiliary winding according to a variation characteristic of the voltage between two ends of the main power switch transistor.

Optionally, if the first time information in the current switching cycle is greater than the first time information in a previous switching cycle, the second time may be made to increase correspondingly, or/and the peak-current of the primary winding may be reduced; and if the first time information in the current switching cycle is smaller than the first time information in the previous switching cycle, the second time may be made to decrease correspondingly, or/and the peak-current of the primary winding may be increased.

Optionally, if the first time information in the current switching cycle is greater than the first time information in the previous switching cycle, the second time may be made to decrease correspondingly, or/and the peak-current of the primary winding may be increased; and if the first time information in the current switching cycle is smaller than the first time information in the previous switching cycle, the second time may be made to increase correspondingly, or/and the peak-current of the primary winding may be reduced.

Optionally, if the first time information is greater than a first threshold or smaller than a second threshold, the main power switch transistor may be controlled to remain off until being awakened again, or a switching frequency of the isolating switch circuit may be maintained at a detection frequency. The detection frequency may be configured to periodically determine whether a load is changed, and if there is a change, a working mode of the isolating switch circuit may be adjusted.

Optionally, the time from the ending moment of the current switching cycle to the turn-on moment of the main power switch transistor in the next switching cycle or the interval between the starting moments of the two switching cycles may be taken as the second time; and a disturbance signal may be superimposed on the second time, making the switch circuit work at a frequency jitter mode, or when the switching frequency is reduced to the lowest, by prolonging the second time, the switching frequency may be further reduced to make the switch circuit work at an intermittent mode.

Optionally, the second time may be adjusted by adjusting the turn-on moment of the main power switch transistor in the next switching cycle; and the peak-current may be adjusted by adjusting the turn-on time of the main power switch transistor in the next switching cycle.

Optionally, a current sampling signal may be obtained by sampling a current flowing through the synchronous rectification transistor, and the current sampling signal may be compared with the first control signal to determine turn-off time of the synchronous rectification transistor so as to adjust the first time information.

Optionally, the isolating switch circuit may further include a primary control circuit, and the primary control circuit may be connected with a control end of the main power switch transistor. The primary control circuit may include a first time information detection circuit and an adjustment circuit, and the adjustment circuit may include a second time adjustment circuit or/and a peak-current adjustment circuit. The adjustment circuit may receive the detection signal representing the first time information outputted by the first time information detection circuit, and the second time may be adjusted by the second time adjustment circuit or/and the peak-current may be adjusted by the peak-current adjustment circuit.

The present invention further provides a control method of an isolating switch circuit, and the isolating switch circuit includes a main power switch transistor, a transformer and a synchronous rectification transistor. The transformer includes a primary winding and a secondary winding, the main power switch transistor is connected with the primary winding, the synchronous rectification transistor is connected with the secondary winding, and The control method includes following steps: a secondary control circuit receives a first control signal representing first time information, the secondary control circuit is connected with a control end of the synchronous rectification transistor, and the first control signal is configured to control turn-off of the synchronous rectification transistor; the first time information is: time from a moment when the synchronous rectification transistor turns off a parasitic diode to start freewheeling to a moment when a secondary current decreases to zero within one switching cycle, or a ratio of the time from the moment when the synchronous rectification transistor turns off the parasitic diode to start freewheeling to the moment when the secondary current decreases to zero within one switching cycle to time from a turn-on moment of the synchronous rectification transistor to the moment when the secondary current decreases to zero, or a product of the time from the moment when the synchronous rectification transistor turns off the parasitic diode to start freewheeling to the moment when the secondary current decreases to zero within one switching cycle and a sampling voltage signal representing an output voltage; and the first time information is detected from a primary to obtain a detection signal representing the first time information, and a state of the main power switch transistor is adjusted through a primary control circuit according to the detection signal representing the first time information.

Optionally, the first control signal may be obtained by a following method: sampling the output voltage or/and an output current of the isolating switch circuit to obtain the corresponding sampling voltage signal, and comparing the corresponding sampling voltage signal with a corresponding reference signal to obtain the first control signal representing the first time information.

Optionally, according to the detection signal representing the first time information, second time or/and a peak-current of the primary winding may be adjusted, and the second time may be time from an ending moment of a current switching cycle to a turn-on moment of the main power switch transistor in a next switching cycle or an interval between starting moments of two switching cycles.

Optionally, the first time information from the primary may refer to obtaining the detection signal representing the first time information through directly detecting or detecting a voltage between two ends of the main power switch transistor via auxiliary winding according to a variation characteristic of the voltage between two ends of the main power switch transistor.

Optionally, if the first time information in the current switching cycle is greater than first time information in a previous switching cycle, the second time may be made to increase correspondingly, or/and the peak-current of the primary winding may be reduced; and if the first time information in the current switching cycle may be smaller than the first time information in the previous switching cycle, the second time may be made to decrease correspondingly, or/and the peak-current of the primary winding may be increased.

Optionally, if the first time information in the current switching cycle is greater than the first time information in the previous switching cycle, the second time may be made to decrease correspondingly, or/and the peak-current of the primary winding may be increased; and if the first time information in the current switching cycle is smaller than the first time information in the previous switching cycle, the second time may be made to increase correspondingly, or/and the peak-current of the primary winding may be reduced.

Optionally, the time from the ending moment of the current switching cycle to the turn-on moment of the main power switch transistor in the next switching cycle or the interval between starting moments of the two switching cycles may be taken as the second time; and a disturbance signal may be superimposed on the second time, making the switch circuit work at a frequency jitter mode, or when the switching frequency is reduced to the lowest, by prolonging the second time, the switching frequency may be further reduced to make the switch circuit work at an intermittent mode.

Compared with the prior art, the technical solution of the present invention has the following advantages: the present invention takes the first time information as a characteristic to control and adjust the primary and secondary sides without requiring an optical coupler to transmit the information of the primary and secondary sides. The primary side identifies the first time information by detecting the voltage between two ends of the main power switch transistor, and the secondary side compares the sampling output voltage or/and output current with the corresponding reference signal to obtain the first control signal representing the first time information. The primary side can adjust the second time and the peak-current according to the first time information. The present invention does not need to use the optical coupler to carry out isolated transmission of primary and secondary signals, which reduces the cost of the circuit, and meanwhile the freewheeling time of a parasitic diode of a synchronous rectification transistor is taken as a characteristic to carry out identifying and controlling, such that the control and adjustment is more precisely.

DETAILED DESCRIPTION OF THE INVENTION

The preferable embodiments of the present invention are described in detail below with reference to the accompanying drawings, but the present invention is not limited thereto. The present invention covers any alternatives, modifications, equivalent methods and solutions in the spirit and scope of the present invention.

In order to make the public have a thorough understanding of the present invention, the specific details are described in the following preferable embodiments of the present invention, and the present invention can also be fully understood by those skilled in the art without descriptions of these details.

The present invention is described more specifically by way of example with reference to the accompanying drawings in the following paragraphs. It should be noted that all the accompanying drawings are drawn in a simplified form and all of them are drawn in non-accurate proportions, which are merely for conveniently and clearly illustrating embodiments of the present invention.

Figure 1:
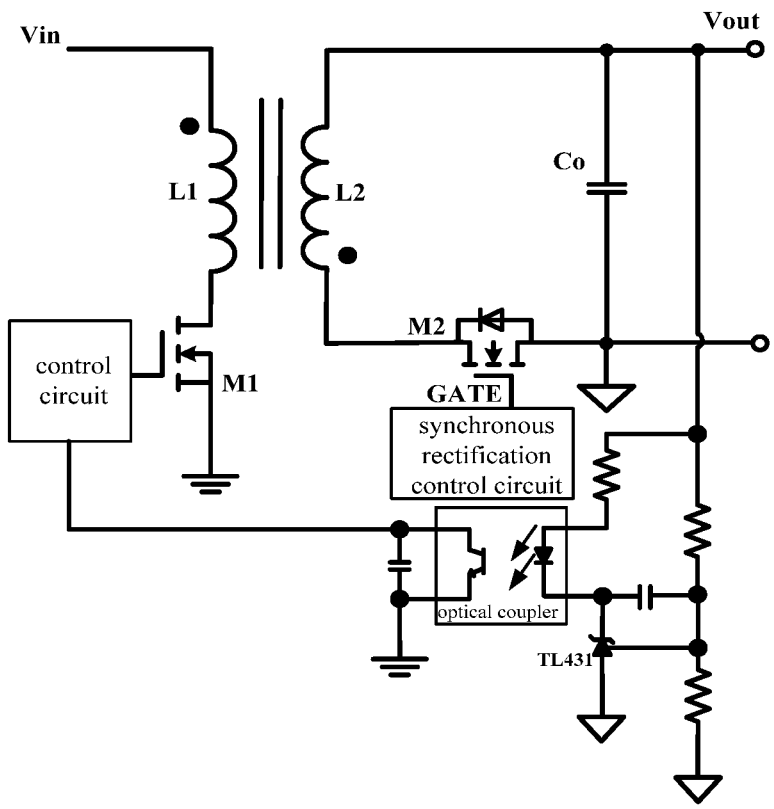
FIG. 1 is a structural principle diagram of a flyback switch circuit of the prior art.
Figure 2:
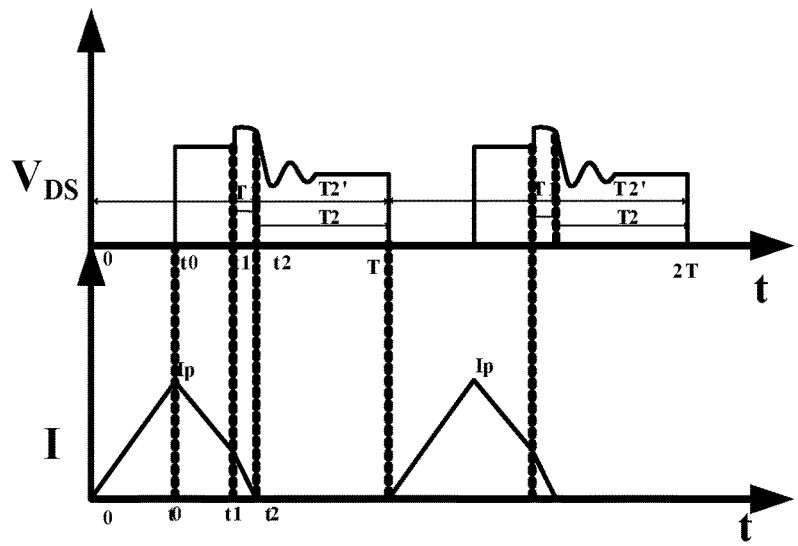
FIG. 2 is a schematic diagram illustrating a working waveform of an isolating switch circuit of the present invention.

As shown in FIG. 2, a working waveform of the isolating switch circuit of the present invention is shown, including a waveform of a voltage $V_{DS}$ between both ends of a main power switch transistor M1 and a primary and secondary current I. A switching cycle is from 0 to T, and the turn-on time of the main power switch transistor M1 is from 0 to t0. Since the impedance of the main power switch transistor M1 is very small during the turn-on period of the main power switch transistor M1, the voltage at two ends thereof is approximately zero. During this period, the primary current increases from 0 to a peak-current Ip. At t0, the main power switch transistor M1 is turned off, the primary current is zero, and a synchronous rectification transistor M2 of a secondary side is turned on. At this time, the secondary current begins to decline from the peak current Ip. It should be noted that the value of the secondary peak-current Ip and the value of the primary peak-current Ip can be the same or different. In FIG. 2, for the convenience of illustrating and describing, they can be equivalent to a current of one side, i.e. an equivalent excitation current. Therefore, the two are regarded as the same. However, the value of the secondary peak-current Ip and the value of the primary peak-current Ip are mainly determined by the turn number ratio of the primary side to the secondary side. During the period t0 to t1 the synchronous rectification transistor M2 is turned on, and the secondary current declines at this time. At t1, the synchronous rectification transistor M2 is turned off, a parasitic diode (also known as a body diode) of the synchronous rectification transistor M2 starts to freewheel, and the secondary current continue to decrease. At t2, the secondary current is decreasing to zero. Take the period between t1 to t2 as the first time T1, in this period, the voltage $V_{DS}$ has a relatively strong identifiability, and the detection is more precise. For example, a detection signal representing the first time T1 can be relatively accurately obtained by a way of detecting a rising edge and a falling edge. The period between t2 to T represents second time T2. That is the time from the moment when the freewheeling of the parasitic diode ends to a turn-on moment of the main power switch transistor in the next switching cycle. Although the detailed description of this embodiment takes the first time T1 as an example, the first time T1 is only a representing form of the first time information in the present invention. In this embodiment, "a ratio of a turn-on moment of the synchronous rectification transistor to the moment when the secondary current decreases to zero" and "a product of time from the moment when the synchronous rectification transistor turns off the parasitic diode to start freewheeling to the moment when the secondary current decreases to zero within one switching cycle and a sampling voltage signal representing an output voltage (that is a product of the first time T1 and the output voltage Vo) are taken as the first time information. Regarding "the product of the first time T1 and the output voltage Vo", the first time T1 and the signal representing the output voltage can be detected at the primary side, and the product of the two is obtained. While at the secondary side, due to the existence of L×ΔI=T1×Vo, ΔI can be used to represent T1×Vo. Meanwhile, a first control signal Vc can be used to represent the first time information. Therefore, ΔI and the first control signal Vc can represent each other.

At the secondary side of the isolating switch circuit, a sampling voltage signal can be obtained by sampling an output voltage or/and an output current of the isolating switch circuit, and the corresponding sampling voltage signal is compared with a first reference signal to obtain the first control signal Vc representing the first time. The first control signal is applied to the synchronous rectification transistor M2 to adjust the first time T1 self-adaptively. The first time T1 decreasing as a load becomes heavier; and the first time T1 increasing as the load becomes lighter. The change trend of the first control signal Vc is the same as or contrary to that of the first time T1. In order to facilitate illustration, although the figure only shows the case of sampling the output voltage, the output current can also be sampled; in addition, the first control signal can be generated by setting signals additionally.

Take the first time T1 as a characteristic to control and adjust the primary and secondary sides without requiring an optical coupler to transmit the information of the primary and secondary sides. The primary side identifies the first time T1 by detecting the voltage between two ends of the main power switch transistor, and the secondary side compares the sampling voltage signal with the first reference signal Vref1 to obtain the first control signal Vc representing the first time T1. The primary side can adjust the second time T2 and the peak-current Ip according to the first time.

If the first time T1 in the current switching cycle is greater than first time T1 in a previous switching cycle, the second time T2 is made to increase correspondingly, or/and the peak-current Ip of the primary winding is reduced; and if the first time T1 in the current switching cycle is smaller than the first time T1 in the previous switching cycle, the second time T2 is made to decrease correspondingly, or/and the peak-current Ip of the primary winding is increased.

Certainly, the primary and secondary sides can also "appoint" there is an association opposite to the above-mentioned one among the first time T1, the second time T2 and the peak current Ip. That is, if the first time T1 in the current switching cycle is greater than first time T1 in the previous switching cycle, the second time T2 is made decrease correspondingly, or/and the peak-current Ip of the primary winding is increased; and if the first time T1 in the current switching cycle is smaller than the first time T1 in the previous switching cycle, the second time T2 is made to decrease correspondingly, or/and the peak-current Ip of the primary winding is increased. Thus, it can be seen that the first time T1 is a "medium" that can be identified by the primary and secondary sides, so that the first time does not need to be transmitted between the primary side and the secondary side. Both the primary and secondary sides "appoint" a consistent association among the first time T1, the second time T2, and the peak current Ip, which can all be achieved. The relationship between the weight of the load and the first control signal or the first time information is related to an access signal at the positive and negative ends of an error amplifier EA. The first control signal or the first time information can increase or decrease according to the setting when the load becomes lighter, and it is opposite when the load becomes heavier.

The above only describes in detail about the second time T2 from the ending moment of the current switching cycle to the turn-on moment of the main power switch transistor in the next switching cycle. However, as shown in the figures, T2', which represents an interval between start moments of two switching cycles, can also be taken as the second time.

To the present invention, the first time is utilized as a characteristic to carry out identifying and used for controlling or adjusting the main power switch transistor, which can solve the technical problem of the present application basically. The adjustment of the second time and the peak-current according to the first time belongs to a specific application, which further solves the technical problem. In addition, the present invention has a frequency jitter mode and an intermittent working mode (burst mode). The frequency jitter mode, that is superimposing a disturbance signal on the second time, makes the switching frequency jitter, which can solve the problem of EMI incidentally; and the intermittent working mode is that under the case that the load is very light, the switching frequency is reduced to the lowest. For example, at about 22 KHz, the circuit enters the intermittent working mode at this time, making the switching frequency to be reduced to a lower range, such as about 300 Hz, which is more power saving.

Because there are two change trends existing in first time information, it may increase to the first threshold or decrease to the second threshold. When the first time information is greater than the first threshold or smaller than the second threshold, the second time can be no longer further reduced at this time, that is the switching frequency also reaches the "switching frequency is reduced to the lowest" as described above. The main power switch transistor is controlled to remain off until being awakened again, and the awakening can be achieved by the turn-on of the synchronous rectification transistor at the secondary side. Alternatively, a switching frequency of the isolating switch circuit may be maintained at a detection frequency, and the detection frequency can be set below 1000 Hz. The detection frequency is configured to periodically determine whether the load is changed, and if there is a change, the working mode of the isolating switch circuit can be adjusted.

Figure 3:
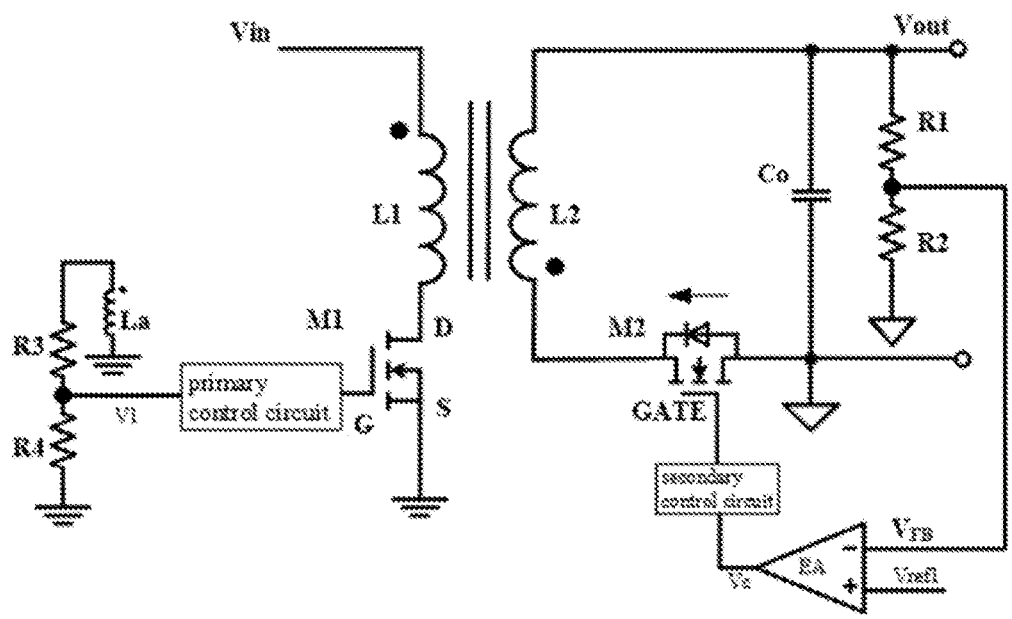
FIG. 3 is a structural principle diagram of an isolating switch circuit of the present invention.

As shown in FIG. 3, a structural principle of the isolated switch circuit of the present invention is shown, and the flyback converter is taken as an example. The isolating switch circuit includes a main power switch transistor M1, a transformer and a synchronous rectification transistor M2, and the transformer includes a primary winding L1 and a secondary winding L2. The main power switch transistor M1 is connected with the primary winding L1, and the synchronous rectification transistor M2 is connected with the secondary winding L2.

An output voltage Vout of the isolating switch circuit is sampled to obtain a voltage sampling signal $V_{FB}$ through a voltage dividing circuit consisting of resistors R1 and R2, and the voltage sampling signal $V_{FB}$ is compared with the first reference signal Vref1 to obtain the first control signal Vc representing the first time T1. The first control signal Vc is connected with the secondary control circuit, and the secondary control circuit is connected with a control end of the synchronous rectification transistor.

An auxiliary winding La is coupled with the transformer in the present invention, and the voltage $V_{DS}$ between both ends of the main power switch is sampled by the voltage dividing circuit consisting of the resistors R3 and R4. Because the source is grounded, the voltage $V_{DS}$ is equal to the voltage of the drain D to obtain a signal V1. Through the judgment of the rising edge and the falling edge of the signal V1, the detection signal representing the first time T1 is obtained. According to the detection signal representing the first time, the second time or/and the peak-current of the primary winding is/are adjusted. The second time is the time from the moment when the secondary current decreases to zero to a turn-on moment of the main power switch transistor in the next switching cycle. In addition, it is also possible to directly sample the voltage of the drain D to obtain the signal V1 representing the voltage between the two ends of the main power switch transistor.

Although the flyback converter is taken as the example in this embodiment, the present invention can be applied to most isolating switch circuits without being limited to the embodiment.

Figure 4:
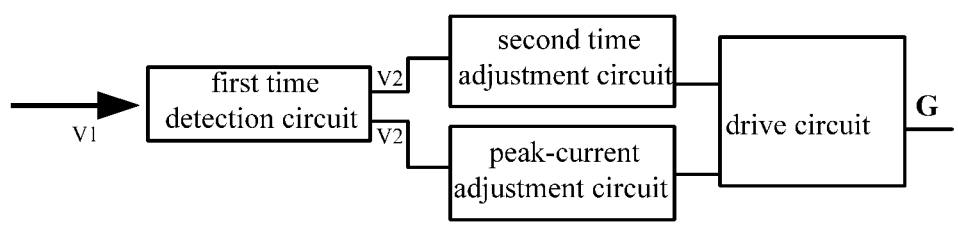
FIG. 4 is a structural block diagram of a primary control circuit.

As shown in FIG. 4, a structural block diagram of the primary control circuit is shown. The primary control circuit is connected with a control end of the main power switch transistor. The primary control circuit includes a first time detection circuit and an adjustment circuit, and the adjustment circuit includes a second time adjustment circuit or/and a peak-current adjustment circuit. The adjustment circuit receives a detection signal V2 representing the first time outputted by the first time information detection circuit, and adjusts the second time by the second time adjustment circuit or/and adjusts the peak-current by the peak-current adjustment circuit. In FIG. 2, only the case that the adjustment circuit includes the second time adjustment circuit and the peak-current adjustment circuit is illustrated. Meanwhile, the primary control circuit further includes a drive circuit, and the primary control circuit is connected with the control end of the main power switch transistor M1 by the drive circuit.

Figure 5:
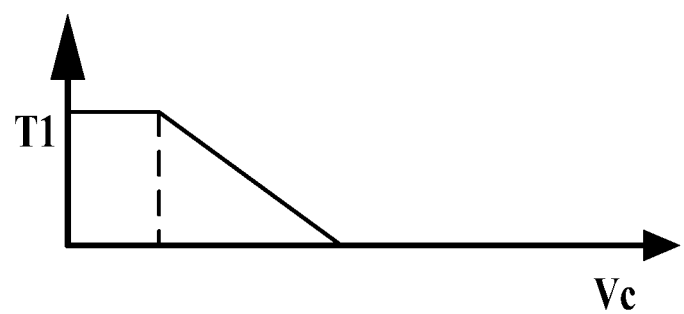
FIG. 5 is a waveform diagram of a change trend of first time and a first control signal.

As shown in FIG. 5, a trend figure of the first time T1 changing with the first control signal Vc is shown. In the figure, for clarity of illustration, a linear change is set, but in fact the change can be linear or non-linear, and the figure only shows one trend. Meanwhile, the figure shows that the first time T1 decreases correspondingly as Vc increases. However, as the signals received by the input end of the error amplifier EA in FIG. 3 are different, the change trend may also be different. For example, the first time can also increase as the Vc increases.

Although the above embodiments are described and illustrated separately, however, relating to parts of the common technologies, it is apparent to those skilled in the art that the embodiments can be replaced and combined with each other. Relating to the content that is not clearly documented in one of the embodiments, another recorded embodiment can be referred to.

The above-mentioned embodiments do not constitute any limitation on the protection scope of the technical solutions. Any modification, equivalent replacement and improvement made within the spirit and principle of the above embodiments should be included in the protection scope of the technical solution.

What is claimed is:

1. An isolating switch circuit comprising a main power switch transistor, a transformer and a synchronous rectification transistor, the transformer comprising a primary winding and a secondary winding, the main power switch transistor being connected with the primary winding, and the synchronous rectification transistor being connected with the secondary winding;
   wherein a secondary control circuit receives a first control signal representing first time information, the secondary control circuit is connected with a control end of the synchronous rectification transistor, and the first control signal is configured to control turn-off of the synchronous rectification transistor; the first time information is:
   time from a moment when the synchronous rectification transistor turns off a parasitic diode to start freewheeling to a moment when a secondary current decreases to zero within one switching cycle,
   or a ratio of the time from the moment when the synchronous rectification transistor turns off the parasitic diode to start freewheeling to the moment when the secondary current decreases to zero within one switching cycle to time from a turn-on moment of the synchronous rectification transistor to the moment when the secondary current decreases to zero,
   or a product of the time from the moment when the synchronous rectification transistor turns off the parasitic diode to start freewheeling to the moment when the secondary current decreases to zero within one switching cycle and a sampling voltage signal representing an output voltage; and
   wherein the first time information is detected from a primary side to obtain a detection signal representing the first time information, and a state of the main power switch transistor is adjusted through a primary control circuit according to the detection signal representing the first time information.

2. The isolating switch circuit according to claim 1, wherein the first control signal is obtained by a following method: sampling the output voltage or/and an output current of the isolating switch circuit to obtain the corresponding sampling voltage signal, and comparing the corresponding sampling voltage signal with a corresponding reference signal to obtain the first control signal representing the first time information.

3. The isolating switch circuit according to claim 1, wherein according to the detection signal representing the first time information, second time or/and a peak-current of the primary winding is/are adjusted, and the second time is time from an ending moment of a current switching cycle to a turn-on moment of the main power switch transistor in a next switching cycle or an interval between starting moments of two switching cycles.

4. The isolating switch circuit according to claim 3, wherein if the first time information in the current switching cycle is greater than the first time information in a previous switching cycle, the second time is made to increase correspondingly, or/and the peak-current of the primary winding is reduced;
   and if the first time information in the current switching cycle is smaller than the first time information in the previous switching cycle, the second time is made to decrease correspondingly, or/and the peak-current of the primary winding is increased.

5. The isolating switch circuit according to claim 4, wherein if the first time information is greater than a first threshold or smaller than a second threshold, the main power switch transistor is controlled to remain off until being awakened again, or a switching frequency of the isolating switch circuit is maintained at a detection frequency, the detection frequency is configured to periodically determine whether a load is changed, and if there is a change, a working mode of the isolating switch circuit is adjusted.

6. The isolating switch circuit according to claim 4, wherein the second time is adjusted by adjusting the turn-on moment of the main power switch transistor in the next switching cycle; and the peak-current is adjusted by adjusting turn-on time of the main power switch transistor in the next switching cycle.

7. The isolating switch circuit according to claim 3, wherein if the first time information in the current switching cycle is greater than the first time information of a previous switching cycle, the second time is made to decrease correspondingly, or/and the peak-current of the primary winding is increased; and
   if the first time information in the current switching cycle is smaller than the first time information in the previous switching cycle, the second time is made to increase correspondingly, or/and the peak-current of the primary winding is reduced.

8. The isolating switch circuit according to claim 7, wherein if the first time information is greater than a first threshold or smaller than a second threshold, the main power switch transistor is controlled to remain off until being awakened again, or a switching frequency of the isolating switch circuit is maintained at a detection frequency, the detection frequency is configured to periodically determine whether a load is changed, and if there is a change, a working mode of the isolating switch circuit is adjusted.

9. The isolating switch circuit according to claim 7, wherein the second time is adjusted by adjusting the turn-on moment of the main power switch transistor in the next switching cycle;
   and the peak-current is adjusted by adjusting turn-on time of the main power switch transistor in the next switching cycle.

10. The isolating switch circuit according to claim 1, wherein detecting the first time information from the primary side refers to obtaining the detection signal representing the first time information through directly detecting or detecting a voltage between two ends of the main power switch transistor via auxiliary winding according to a variation characteristic of the voltage between two ends of the main power switch transistor.

11. The isolating switch circuit according to claim 1, wherein the time from an ending moment of the current switching cycle to a turn-on moment of the main power switch transistor in a next switching cycle or an interval between starting moments of the two switching cycles is taken as second time; and a disturbance signal is superimposed on the second time, making the switch circuit work at a frequency jitter mode, or when the switching frequency is reduced to the lowest, by prolonging the second time, the switching frequency is further reduced to make the switch circuit work at an intermittent mode.

12. The isolating switch circuit according to claim 1, wherein a current sampling signal is obtained by sampling a current flowing through the synchronous rectification transistor, and the current sampling signal is compared with the first control signal to determine turn-off time of the synchronous rectification transistor so as to adjust the first time information.

13. The control method of the isolating switch circuit according to claim 12, wherein the first control signal is obtained by a following method: sampling the output voltage or/and an output current of the isolating switch circuit to obtain the corresponding sampling voltage signal, and comparing the corresponding sampling voltage signal with a corresponding reference signal to obtain the first control signal representing the first time information.

14. The control method of the isolating switch circuit according to claim 12, wherein according to the detection signal representing the first time information, second time or/and a peak-current of the primary winding is/are adjusted, and the second time is time from an ending moment of a current switching cycle to a turn-on moment of the main power switch transistor in a next switching cycle or an interval between starting moments of two switching cycles.

15. The control method of the isolating switch circuit according to claim 12, wherein detecting the first time information from the primary refers to obtaining the detection signal representing the first time information through directly detecting or detecting a voltage between two ends of the main power switch transistor via auxiliary winding according to a variation characteristic of the voltage between two ends of the main power switch transistor.

16. The control method of the isolating switch circuit according to claim 12, wherein if the first time information in the current switching cycle is greater than the first time information in a previous switching cycle, the second time is made to increase correspondingly, or/and the peak-current of the primary winding is reduced; and if the first time information in the current switching cycle is smaller than the first time information in the previous switching cycle, the second time is made to decrease correspondingly, or/and the peak-current of the primary winding is increased.

17. The control method of the isolating switch circuit according to claim 12, wherein if the first time information in the current switching cycle is greater than the first time information in a previous switching cycle, the second time is made to decrease correspondingly, or/and the peak-current of the primary winding is increased; and if the first time information in the current switching cycle is smaller than the first time information in the previous switching cycle, the second time is made to increase correspondingly, or/and the peak-current of the primary winding is reduced.

18. The control method of the isolating switch circuit according to claim 12, wherein the time from an ending moment of the current switching cycle to a turn-on moment of the main power switch transistor in a next switching cycle or an interval between starting moments of the two switching cycles is taken as second time; and a disturbance signal is superimposed on the second time, making the switch circuit work at a frequency jitter mode, or when the switching frequency is reduced to the lowest, by prolonging the second time, the switching frequency is further reduced to make the switch circuit work at an intermittent mode.

19. The isolating switch circuit according to claim 1, the isolating switch circuit further comprising a primary control circuit, wherein the primary control circuit is connected with a control end of the main power switch transistor, the primary control circuit comprises a first time information detection circuit and an adjustment circuit, the adjustment circuit comprising a second time adjustment circuit or/and a peak-current adjustment circuit, the adjustment circuit receives the detection signal representing the first time information outputted by the first time information detection circuit, and the second time is adjusted by the second time adjustment circuit or/and the peak-current is adjusted by the peak-current adjustment circuit.

20. A control method of an isolating switch circuit, the isolating switch circuit comprising a main power switch transistor, a transformer and a synchronous rectification transistor, the transformer comprising a primary winding and a secondary winding, the main power switch transistor being connected with the primary winding, the synchronous rectification transistor being connected with the secondary winding, and the control method comprising following steps: a secondary control circuit receiving a first control signal representing first time information, the secondary control circuit being connected with a control end of the synchronous rectification transistor, and the first control signal being configured to control turn-off of the synchronous rectification transistor; the first time information being: time from a moment when the synchronous rectification transistor turns off a parasitic diode to start freewheeling to a moment when a secondary current decreases to zero within one switching cycle, or a ratio of the time from the moment when the synchronous rectification transistor turns off the parasitic diode to start freewheeling to the moment when the secondary current decreases to zero within one switching cycle to time from a turn-on moment of the synchronous rectification transistor to the moment when the secondary current decreases to zero, or a product of the time from the moment when the synchronous rectification transistor turns off the parasitic diode to start freewheeling to the moment when the secondary current decreases to zero within one switching cycle and a sampling voltage signal representing an output voltage; and detecting the first time information from a primary side to obtain a detection signal representing the first time information, and adjusting a state of the main power switch transistor through a primary control circuit according to the detection signal representing the first time information.

* * * * *